Patented Aug. 17, 1943

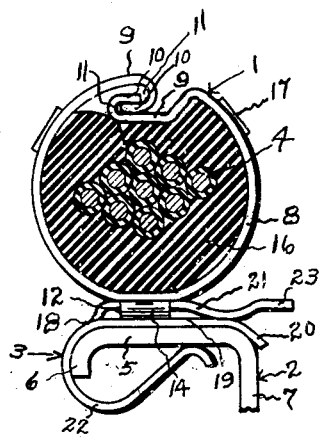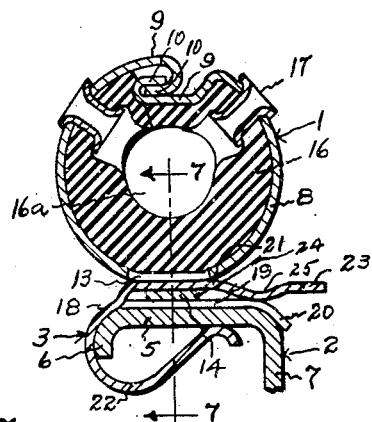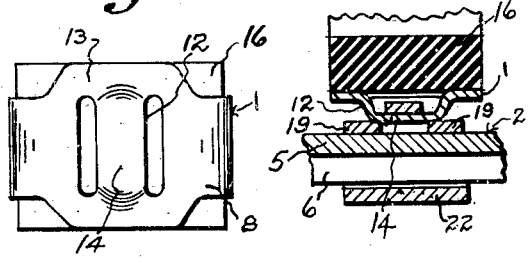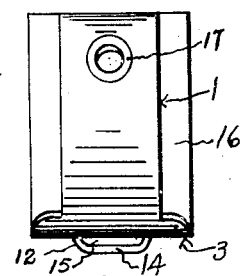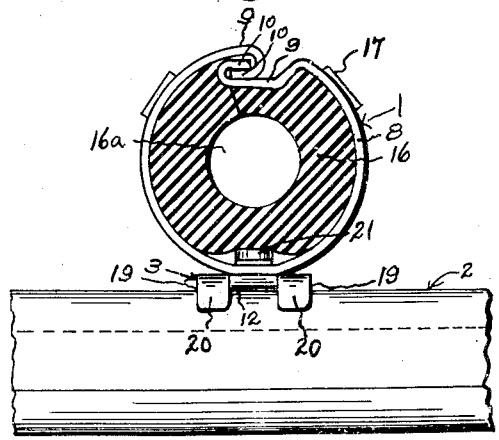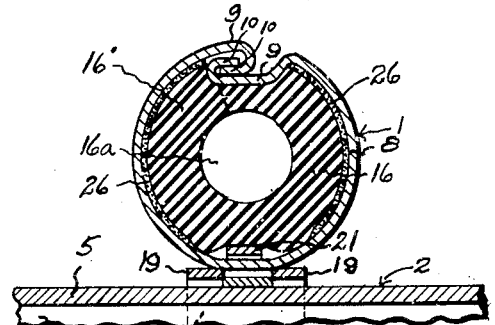

2,327,326

UNITED STATES PATENT OFFICE 2,327,326

FASTENING DEVICE FOR GROUP WIRING AND THE LIKE

Wilmer H. Churchill, Saugus, Mass., assignor to United-Carr Fastener Corporation, Cambridge, Mass., a corporation of Massachusetts Application March 11, 1942, Serial No. 434,213

4 Claims. (Cl. 24—81)

This invention relates to an improved wiring clip and installations of the same.

An object of my invention is the provision of a clip effecting an improvement over a clip which is the subject of application, Serial No. 432,426, filed by Charles L. Hall, February 26, 1942. Thus, my present clip is constructed in a manner different from that of said Hall enabling the clip to be secured to a support in a position turned 90° from the position of the clip provided by the Hall attachment.

A further object is the provision of an article to be attached constructed in a novel manner to effect improved fastener engagement with an attaching member.

Other objects and uses of my invention are apparent from inspection of the drawing and specification hereinbelow set forth.

Referring to the drawing, in which I have illustrated preferred embodiments of my invention:

Fig. 1 is a side view showing my improved wiring clip carrying a plurality of lead wires and secured to a supporting part in position enabling the wires to extend in parallel relation to the length of the support;

Fig. 2 is a sectional view of the installation shown in Fig. 1, the lead wires being omitted;

Fig. 3 is a bottom view of the clip member forming a part of the installation, the clip being shown in closed position;

Fig. 4 is a front view of the clip member shown in Fig. 3;

Fig. 5 is a side view of the installation shown in Fig. 2 and demonstrating how the clip member may be secured to the support in relative position turned 90° from that shown in Fig. 2;

Fig. 6 is a sectional view through Fig. 5 and showing a modified method of securing rubber or the like to the inner face of the clip; and Fig. 7 is a sectional view taken along the line 7—7 of Fig. 2.

Referring to my preferred installation illustrated in Figs. 1 and 2 of the drawing, I have shown an improved clip device which is particularly adaptable for securing wires, conduits and the like to the framework of an airplane or a motor vehicle. My preferred installation includes a clip or loop member 1 secured to a supporting part 2 by means of an attaching member 3. The clip member 1 is adapted to receive and grip one or more articles of manufacture which in my preferred installation are lead wires 4 (Fig. 1) so as to secure the wires in fixed relation to the support. The support 2 may be of any suitable construction, but in my preferred form I have chosen to show one providing an elongated wing 5 having a downwardly turned lip 6 at its outer edge. A web 7 is formed integral with the opposite edge of the wing 5 from the lip 6 and connects the wing 5 with a flange (not shown) by which the support is secured to the framework of the airplane.

The clip member 1 is generally similar to that described in the above-mentioned Hall application, but presents certain improvements over the Hall device, particularly with reference to the construction of the same permitting novel fastener cooperation with the attaching member 3, as hereinbelow set out. The clip member 1 is formed from a single strip of spring metal and provides a bowed body portion 8 and end elements 9—9. Each of the end elements has a reverse-bend element 10 at its outermost end spaced from its respective end element 9 so as to provide a seat 11 (Fig. 1) therebetween. The reverse-bend elements 10—10 are moved into engaged relation by passing one of the elements beneath the other against the normal tension of the bowed body portion 8 to interlock the same, as shown most clearly in Figs. 1, 2, 5 and 6.

As a means of securing the clip 1 in predetermined position relative to the support 2, I have provided an attaching element 12 extending from the body 8 at a point 13 (Fig. 2) on the body preferably substantially diametrically opposite the elements 10 when the elements are in interlocked relation. The element 12 is formed by striking a rectangular portion of the metal of the body 8 out of the plane of the body so as to form a bridge element 14 integrally joined at its ends to the portion 8. The bridge element is spaced from the body 8 providing a passage 15 (Fig. 4) therebetween for a purpose to be described.

In order to insulate the wires 4 from the body 8, a strip 16 of insulating material, which is preferably sponge rubber, is disposed on the inner face of the body 8 and secured thereto in my preferred form by rivets 17 which are headed over upon the outer surface of the body 8 and the inner surface of the strip 16. It will be seen from inspection of Fig. 2 that the rivets 17 are preferably placed intermediate the end elements 9—9 of the clip and the point 13 of the body which, as hereinabove mentioned, is diametrically opposite the ends 9—9 when the clip is closed. As a result of securing the strip 16 to the body 8 in this manner, the strip is in free unsecured relation to the body 8 at the point 13 so as to be separable from the body adjacent the point 13 for a purpose to be described.

The attaching member 3 of my preferred installation provides a base 18 having a pair of rigid fingers 19—19 at one end in spaced parallel relation one to another. Each of the fingers may have a downwardly bent free end portion 20 so as to engage more closely the contour of the supporting part 2, as most clearly shown in Figs. 1 and 2. A spring tongue element 21 is integrally joined to the base 18 and extends from the base intermediate the fingers 19 in the same direction as the fingers. The spring tongue 21 is preferably formed from material taken from between the fingers 19—19, and the tongue is struck from the plane of the fingers 19 so as to be disposed slightly above the same, as most clearly shown in Figs. 1 and 2, to enable the thickness of material of the body 8 to be moved intermediate the tongue and fingers. Although the base 18 and its component elements may be secured to a support by any suitable method, I have preferred to effect this attachment by providing a spring arm 22 which is integral with the base 18 and bent under the fingers 19—19, viewing Figs. 1 and 2. The arm 22 cooperates with the fingers 19—19 so that the elements engage opposed surfaces of the wing 5, as shown in Figs. 1 and 2, to secure the attaching member to the supporting part. It is understood that although the particular attaching member that I have illustrated provides elements such as the rigid fingers 19 and the arm 22 which are shaped and arranged to engage with a supporting part of the preferred construction illustrated, the construction of the elements by which the attaching member is secured to a support could be modified substantially without departing from the scope and spirit of my invention.

Assembly of the parts in my clip device is preferably accomplished by first securing the attaching members 3 to the supporting member 2 at spaced points along the length of the supporting member. This is accomplished with the construction of my preferred installation by moving the lip 6 and the wing 5 of the supporting member between the spring arm 22 and the fingers 19—19 so that the support is securely gripped between the elements 19 and 22, as shown in Figs. 1 and 2. Immediately thereafter, or at such time as it is desired to secure the wires in position, the clip member 1 is secured in fastened engagement with the respective attaching members. As a result of the construction of my clip member, wherein I have provided the bridge element 14 as a component part of the clip member, it is possible to secure the clip member to the attaching member with the clip member disposed in two positions relative to the support. Thus, the clip member may be secured to the support with its axis in parallel relation to the length of the wing 5, as shown in Figs. 1 and 2, or the clip member may be secured to the support with its axis in transverse relation to the length of the wing 5, as shown in Figs. 5 and 6. In securing the clip to the support in the first-mentioned relative position, the clip member is moved toward the attaching member so as to project the free end 23 of the spring tongue 21 through the passage 15 between the bridge element 14 and the body 8 of the clip. Thereafter, the clip is moved along the tongue until an edge 24 of the bridge element 14 (Fig. 2) snaps by a depressed cam element 25 of the spring tongue, as most clearly shown in Fig. 2. The bridge element 14 is now secured between the fingers 19—19 and the spring tongue 21, as most clearly shown in Fig. 7, and as a result the clip member and attaching member are secured in detachable assembly. Should it be desired to secure the clip to the attaching member so as to dispose the clip in the second position relative to the support, as illustrated in Figs. 5 and 6, it is only necessary to insert the free end 23 of the spring tongue 21 between the body 8 at the point 13 and the rubber strip 16, which is free from the body 8 adjacent that point and, thereafter push the clip 1 along the tongue until the width of the body 8 of the clip is secured between the spring tongue and the fingers 19—19 under the tension provided by the spring tongue. It will be noticed that when the clip member is secured in the aforesaid second position of Figs. 5 and 6, the bridge element 14 is disposed in engagement with the wing 5 of the support between the rigid fingers 19—19.

The clip members are normally secured to the support with the end elements 9—9 in open spaced position to receive the wires 4 therebetween as described in detail in the above-mentioned Hall application. After the wires 4 have been extended between the ends 9 into the pocket 16ᵃ of the strip 16, the reverse-bend elements 10 of the clip are brought into interlocking closed relation so that the strip 16 forms a complete ring surrounding the wires 4, as shown in Fig. 1, and maintaining the wires in fixed insulated relation to the metal clip.

In Fig. 6 I have shown a modified construction of my clip device. The installation of Fig. 6 is identical to Fig. 5 except that in providing the rubber strip 16 of the clip shown in Fig. 5 which is secured to the body 8 of the clip by the rivets 17, I have chosen to secure the strip 16' of Fig. 6 to the body 8 of the clip by an adhesive such as glue 26. It will be noticed that the rubber strip 16' is secured to the body 8 of the clip at points intermediate the clip ends 10 and the point 13 diametrically opposite the clip ends 10 when the same are in closed relation so as to leave the strip 16' in free separable relation from the body 8 at the point 13 to permit the spring tongue 21 of the attaching member 3 to be disposed between the rubber strip 16' and the body 8 of the clip when it is desired to secure the clip member to the support in the second of the above-mentioned relative positions.

As a result of my invention, wherein I have provided the bridge element 14 forming an integral part of the clip member, the clip member may be secured to the support in either one of two relative positions depending upon the purposes of the manufacturer. This feature is highly desirable to manufacturers as it is possible to form a right angle bend in the lead wires and hold the wires on both sides of the bend without the necessity of substituting a clip member or attaching member of different construction to provide for the change in direction.

Although I have illustrated and described preferred embodiments of my invention, I do not wish to be limited thereby because the scope of my invention is best defined by the following claims.

I claim:

1. A fastener device of the class described comprising an article-gripping member having an opening therein, an attaching member having a base portion, said base having an element engaging said article-gripping member through said opening and an element engaging an opposite side of said member whereby said elements cooperate to secure said attaching member in applied position to said article-gripping member, and said attaching member having a fastener element extending from said base for engaging a supporting part to secure said article-gripping member to said part.

2. A fastener device of the class described comprising a loop adapted to receive and grip an article, said loop having an element struck therefrom in the form of a bridge, said bridge having its opposed ends integrally joined to said loop and a portion intermediate said ends spaced from said loop, an attaching member having a base portion, said base having a finger-shaped element engaging said bridge portion between said bridge and said loop and an element engaging an opposite side of said bridge whereby said elements cooperate to secure said attaching member in applied position to said loop, and said attaching member having a spring arm extending from said base for engaging a supporting part to secure said loop to said part.

3. A fastener device for attaching wiring and the like comprising, in combination, a wire gripping and holding member, a support-engaging member and interengaging means in the form of a tongue and a loop, one provided by the support-engaging member and the other by the wire gripping and holding member whereby the said members may be assembled and disassembled at will.

4. A fastener device for attaching wiring and the like comprising, in combination, a wire gripping and holding member, a support-engaging member and interengaging means in the form of a tongue and a loop, one provided by the support-engaging member and the other by the wire gripping and holding member whereby the said members may be assembled and disassembled at will, and said support-engaging member having support-gripping means whereby it may be easily attached to and detached from a support.

WILMER H. CHURCHILL.